United States Patent Office

WILLIAM J. WALKER, OF BALTIMORE, MARYLAND, ASSIGNOR TO CAROLINE M. WALKER, OF SAME PLACE.

*Letters Patent No. 63,676, dated April 9, 1867.*

---

IMPROVEMENT IN THE MANUFACTURE OF LIGHT BREAD.

---

*The Schedule referred to in these Letters Patent and making part of the same.*

---

TO ALL WHOM IT MAY CONCERN:

Be it known that I, WILLIAM J. WALKER, of the city of Baltimore, and State of Maryland, have invented a new and improved Mode of the Treatment of Flour and the Manufacture of Bread; and I do hereby declare that the following is a full and exact description thereof.

The nature of my invention and improvement is as follows: I propose to manufacture light bread, uniting the healthful advantages claimed for non-fermented bread with extraordinarily nutritious qualities, by an intelligent combination of the articles known to the chemist as bicarbonate of soda, muriatic acid, and superphosphate of lime, with flour and water, in the proper proportions. The flour in common use, made white to meet the demands of society, is separated from nearly all the phosphate of lime contained by the wheat, which grows in the shell of the wheat berry, and is carried away with the bran in the process of bolting. This phosphate, forming as it does nearly the whole of the animal skeleton, is designed by nature for food, and should enter into all perfect bread. But as if the separation from our most valuable food of this important ingredient were not sufficient, the process of yeast fermentation, by which bread is commonly made light, destroys nearly all of the gluten and sugar contained by the flour which enters into it, two substances of far greater nutrient value than an equal quantity of anything that remains behind. These latter considerations, together with the equally well-established fact that bread made by ferment contains certain vegetable germs that are injurious to man's digestive organs, have led to numerous efforts to manufacture a good article without ferment, by which the gluten and sugar of the flour, at least, would be preserved, and the germs or fungi of the yeast plant would not be formed. Some of these efforts have accomplished important results. The aerated bread is a great improvement on bread made from ferment, but it labors under the disadvantage of requiring expensive machinery for its manufacture, and is not popular with the masses of the people because it does not seem to produce a satisfying impression on the stomach. The superphosphate of lime, converted by a peculiar process into a pulverulent, and bicarbonate of soda, make a valuable baking powder for biscuit and pastry, and possess the great advantage of restoring to the bread the phosphate which has been taken in the bran from the flour; but for the manufacture of light bread so large a quantity of these ingredients is required that they become too expensive for general use, and at the same time lodge in the bread so much of the phosphate of lime and soda as to make them perceptible to the taste, and injurious in such proportions to the healthfulness of the food. Muriatic acid and bicarbonate of soda have also been appropriated to the manufacture of bread; and the fact that the action of this acid on the sodium of the carbonate produces, and lodges in the dough with which they may be mixed, the article known as common salt—an essential ingredient of good bread—evolving at the same time carbonic acid gas, which in its efforts to escape must give porosity to the loaf, would seem to point to these as substances peculiarly designed by nature for the purpose to which they are here applied. But it is found by experience that where enough of these ingredients is employed to produce sufficient gas to make the bread as light as the public demand, the quantity of salt lodged in the bread, though not excessive, is too great for the taste of many people. In addition to this obstacle the operative encounters the difficulty of apportioning his ingredients in the right quantities, so that all the carbonate of soda may be decomposed and every particle of the muriatic acid neutralized. If a trace of either of these substances remains behind, which in practice is unavoidable, an unpleasant taste and an unhealthy ingredient will be imparted to the bread. Now if bicarbonate of soda be incorporated into dough in quantity sufficient to produce, when decomposed, the gas required to give the desired porosity to the loaf, and if enough muriatic acid be employed to produce by its action on the sodium present in the carbonate the common salt requisite for good bread, and if phosphoric acid, in feeble combination with a base, as found in the superphosphate of lime, be added slightly in excess of the quantity required to decompose the residue of carbonate of soda, then the muriatic acid, being perfectly free, or from some other cause, will first exhaust itself upon its equivalent of sodium, after which what is called the free acid of the phosphate will unite with all the soda present, and the small excess of phosphoric acid will remain in combination with the lime, a comparatively tasteless and nutritious ingredient of the food. The combination of this free phosphoric acid with the soda present will leave the neutral phosphate of lime and produce the phosphate of soda, both of which will be lodged in small quantities in the dough restoring an ingredient taken from the flour in the bran in about the quantity supplied by nature, and adding very materially to the nutritious quality of the bread.

Experiment proves that one hundred (100) grains of bicarbonate of soda decomposed in dough made from one (1) pound of flour, in the process of baking will evolve sufficient gas to make the loaf light. One hundred and ten (110) grains of muriatic acid, specific gravity 1.21, combining with its equivalent of sodium, will produce about one hundred and twenty (120) grains of common salt, decomposing about eighty-nine (89) grains of bicarbonate of soda. This would leave eleven (11) grains of bicarbonate of soda in the dough, to decompose which about thirty (30) grains of superphosphate of lime will be required. The superphosphate of lime varies in its quantity of free phosphoric acid according to the moisture or undissolved bone it may contain. I take as my standard a tolerably dry article, and to be certain to have sufficient to more than decompose the carbonate of soda assigned to it, I use more than a close calculation would indicate. One hundred and twenty grains of salt for one pound of flour is not too much, and when more of this article is required it can be added. The proportions, then, in which I use the ingredients mentioned are about as follows: For every one (1) pound of flour one hundred (100) grains of bicarbonate of soda, one hundred and ten (110) grains of muriatic acid, standard, and thirty-four grains of superphosphate of lime. I do not, of course, propose to confine myself to these quantities or proportions, but may change both according to the quality of the ingredients used, or as experience may indicate to be desirable. Nor will I confine myself for my "balancing agent," if it may be so termed, to the superphosphate of lime, but may use any other acid phosphate or acid salt which will subserve the purpose of decomposing the carbonate of soda left in the dough after the muriatic acid employed has been neutralized. Nor will I confine myself to muriatic acid as the principal active agent in decomposing the soda, but may avail myself of any other acid which will accomplish the object in view, the principle of combination being the same in all cases. For convenience the superphosphate of lime may be dissolved in muriatic acid in the proportions desired, and thus kept for use in one vessel.

In making bread with the materials here described, it is only necessary to ascertain the quantity of water required to convert a given amount of flour into a sticky thin dough. Into about half the water put the required quantity of the acids, and in the other dissolve the proper quantity of bicarbonate of soda; then make the flour into a ridge in the middle of a pan or trough, pour one solution into one side, and the other into the opposite side, and mix on each side into a batter until the flour is nearly taken up, when the whole mass must be thoroughly and quickly mixed together, put at once into pans, covered, and then without delay into the oven, previously made hot for the purpose, and baked. Practice may of course suggest other methods of making the bread better or more convenient than this. The best of biscuit, pastry, and cake can be made by this process.

What I claim, and desire to secure by Letters Patent of the United States, is—

The combination of superphosphate of lime and muriatic acid in nearly equal quantities, and bicarbonate of soda in such quantity as when united in the dough will, in process of baking, evolve sufficient gas to make light bread or pastry, substantially as above described.

W. J. WALKER.

Witnesses:
  JOHN S. HOLLINGSHEAD,
  JOHN D. BLOOR.